(12) United States Patent
Lust

(10) Patent No.: US 8,770,244 B2
(45) Date of Patent: Jul. 8, 2014

(54) RUNFLAT DEVICE AND METHOD FOR FITTING THE SAME

(75) Inventor: Richard Lust, Albacete (ES)

(73) Assignee: Run Flat Systems Limited, Middlesex (GB)

( * ) Notice: Subject to any disclaimer, the term of this patent is extended or adjusted under 35 U.S.C. 154(b) by 1220 days.

(21) Appl. No.: 12/449,378

(22) PCT Filed: Feb. 5, 2008

(86) PCT No.: PCT/GB2008/000389
§ 371 (c)(1),
(2), (4) Date: Nov. 3, 2009

(87) PCT Pub. No.: WO2008/096114
PCT Pub. Date: Aug. 14, 2008

(65) Prior Publication Data
US 2010/0096059 A1    Apr. 22, 2010

(30) Foreign Application Priority Data

Feb. 5, 2007  (GB) .................................... 0702156.1

(51) Int. Cl.
*B60C 17/06*    (2006.01)
(52) U.S. Cl.
USPC .............................................. 152/520; 301/8
(58) Field of Classification Search
USPC ....................... 152/516, 518–520, 158; 301/8
IPC ...................................................... B60C 17/06
See application file for complete search history.

(56) References Cited

U.S. PATENT DOCUMENTS

| | | | | |
|---|---|---|---|---|
| 3,996,985 | A | * | 12/1976 | Cady et al. .................. 152/340.1 |
| 4,263,953 | A | * | 4/1981 | Miceli ............................ 152/158 |
| 5,370,004 | A | * | 12/1994 | Bossart et al. ............. 73/863.23 |
| 7,036,543 | B2 | | 5/2006 | Mori |
| 7,040,365 | B2 | | 5/2006 | Lüst |

FOREIGN PATENT DOCUMENTS

| | | | |
|---|---|---|---|
| DE | 102004038950 | 2/2006 | |
| EP | 20150 | * 12/1980 | ............. B60C 17/04 |
| EP | 0279533 | 8/1988 | |
| FR | 2637846 | 4/1990 | |
| FR | 2843335 | 2/2004 | |

OTHER PUBLICATIONS

English Abstract of FR 2843335.
English Abstract of FR 2637846.
English Abstract of DE 102004038950.

* cited by examiner

*Primary Examiner* — Justin Fischer
*Assistant Examiner* — Philip N Schwartz
(74) *Attorney, Agent, or Firm* — Dykema Gossett PLLC

(57) ABSTRACT

The present invention relates to a runflat device arranged to be disposed within a wheel well of a wheel having a rim (5) for securing a tire (1), the device comprising a valve assembly (7, 8, 9, 10) arranged to be secured to the wheel and a plurality of part-annular components, said runflat device arranged to be drawn onto the wheel by a retraction mechanism when air pressure is applied to said valve (7, 8, 9, 10).

12 Claims, 2 Drawing Sheets

RUNFLAT DEVICE AND METHOD FOR FITTING THE SAME

FIELD OF THE INVENTION

The present invention relates to a runflat device and a method for fitting the same, and to a wheel so fitted.

BACKGROUND OF THE INVENTION

On a normal vehicle wheel and tyre assembly, the beads of the tyre sit in 'seats' of the wheel rim and, when the tyre is inflated, internal air pressure holds the beads in place.

In the event of a tyre deflation whilst a vehicle is in motion the tyres beads can move inwards from the wheel rims seats. When this occurs, grip between the tyre and the wheel rim is decreased. This can allow the tyre to slip circumferentially around the wheel and as a consequence the vehicle loses traction, as the wheel can rotate within the tyre and its beads, or the vehicle can loose braking efficiency as the rotation of the wheel may be stopped by the vehicles brakes while the tyre continues to rotate.

There are devices, variously known as 'well fillers', available to prevent tyre beads slipping into the wheel's well, but these do not stop the tyre moving circumferentially round the wheel rim when running deflated due to the well filler of necessity being of a lesser diameter than the wheel's seats and therefore the tyres beads. It is necessary for well filler's to be of a smaller diameter than the wheel's seats and the tyres beads otherwise it would be impossible to fit the tyre to the wheel. These devices are not designed to lock the tyres beads into place on the wheel rim and therefore the tyre may move circumferentially around the wheel rim, therefore traction and braking control may be compromised.

There are devices, variously known as 'runflat assemblies' or 'runflat devices' that may be fitted to a single piece drop centre wheel rim. These may have a diameter greater than the seats and the flanges of the wheel rim and be of sufficient diameter to support the tread of the tyre when running flat. Generally the base of these devices, where they fit and come into contact with a single piece drop centre wheel rim, have a small footprint area as space has to be left in the wheel's well to allow the tyres outer bead to be fitted when fitting the tyre. As the wheel's well is not completely filled and the device sits on a small footprint area stability of the runflat device may be compromised when the vehicle is running with a deflated tyre. The device can be forced sideways within the wheel's well in extreme runflat situations. In systems using an annular base fitted with a second outer ring, or segments forming a ring, which may rotate when the vehicle is running on a flat tyre, the small footprint area available to support the second or rotate-able ring or annular segments is narrow, reducing the capability of spreading the rotational forces and vehicle weight over a larger area and reducing pressure between the rotating parts. High pressures over a small contact area increase friction, which produces heat, reducing the devices longevity and therefore runflat distance capability. These devices can not lock the tyres beads in place in the wheel rims seats, therefore although the tyre may be supported when running flat, traction and braking may be compromised as the tyre is able to slip circumferentially around the wheel rim. Most current runflat devices take a long time to fit, relative to fitting the tyre, and for fitting require extra tools or equipment in addition to the tyre fitters normal tools and equipment.

There are devices variously known as 'bead lock' or 'bead retention devices' but these can not be fitted inside a single piece drop centre wheel rim as it has proven impossible to fit the tyre to the wheel rim in conjunction with one of these devices.

The present invention attempts to overcome the above problems faced in the known art and thus provides a method and system for fitting a runflat device to a vehicle wheel.

SUMMARY OF THE INVENTION

An embodiment of the invention relates a runflat device arranged to be disposed within a wheel well of a wheel having a rim for securing a tyre, the device comprising a valve assembly arranged to be secured to the wheel and a plurality of part-annular components, said runflat device arranged to be drawn onto the wheel by a retraction mechanism when air pressure is applied to said valve.

A further aspect of the invention relates to a method of fitting a runflat device into a wheel and tyre assembly comprising the steps of
  fitting a runflat device and retraction mechanism inside a deflated tire, said tyre being fitted within a wheel rim with its inner bead secured in place within said rim;
  securing a multi-stage valve assembly provided for the tyre to the wheel rim;
  connecting the multistage valve assembly to the base of the runflat device;
  fitting an outer bead of the tyre within the wheel rim;
  drawing the runflat device into the wheel and tyre assembly by supplying air pressure to the valve assembly; and
  adjusting air flow in the multi-stage valve by turning said valve towards an opening for selecting the direction of air flow.

A further aspect of the invention relates to a multi-stage valve mechanism capable of multi-directional air flow, said multi-stage valve being attached to the base of the wheel's standard air valve, said multi-stage valve being operated by turning the same in the direction of desired air flow.

BRIEF DESCRIPTION OF THE DRAWINGS

In order that the present invention is more readily understood, an embodiment thereof will now be described by way of examples with reference to the accompanying drawings.

DETAILED DESCRIPTION OF THE EMBODIMENTS

Figure 1:
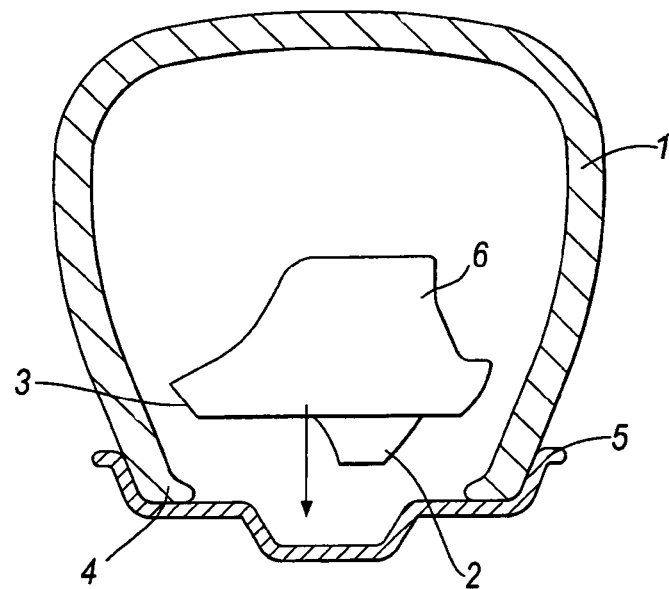
FIG. 1 is a diagram depicting the components of the present invention.

The preferred embodiment includes a wheel rim (5) and standard bolt-on air valve that has been fitted with a special air valve assembly, which will be described in more detail later, a pneumatic tyre (1) and a runflat device of a form and width to allow it to be seated not only in the wheel's well but also located and supported on each of its sides, on the outer edges of the wheel inside the tyre (1) and adjacent to the tyre beads (4). The circular runflat device consists of two or more annular parts that may be drawn together within the wheel and tyre assembly, with the deflated tyre (1) already fitted to the wheel rim (5) and both its beads (4) seated in the wheel's seats, by air pressure supplied through the wheel's air valve. Air is passed by normal means through the standard air valve which is itself connected internally to a multi-stage valve which can pass air pressure to a pneumatic apparatus, which is arranged to draw the two or more parts together within the wheel's well to a set and predetermined pressure to enable the parts of the runflat device to be locked automatically by mechanical means onto the wheel and its well. Once this predetermined pressure is met and the annular parts of the runflat device are joined and locked onto the wheel rim (5) inside the tyre (1) the multi-stage air valve may be closed and the next stage opened to allow the tyre (1) pressure to be adjusted in the normal way, to its required pressure.

The preferred embodiment provides for the runflat device to be fitted in the following way:

The tyre (1) is fitted to the wheel and inflated in the normal way. This ensures both beads (4) of the tyre (1) are seated in the wheel's seats on each side of the wheel. The tyre (1) is then deflated and the outer bead of the tyre (1) is levered off the wheel in the normal way using standard tyre fitters equipment. The inner bead is left in place.

The two of more annular segments of the device are inserted inside the tyre (1) and connected together with a retraction band or other apparatus used to draw the two or more parts together. The runflat device, annular parts and retraction band or retraction apparatus, are laid out inside the tyre (1) to describe a larger diameter than the flanges of the wheel to allow fitting of the tyres outer bead in the normal fashion, i.e. by the tyre fitter inserting one side of the bead in the wheel's well while rotating the wheel and tyre assembly and levering the other side of the tyre (1) over the wheel's flange.

Before fitting the outer tyre bead to the wheel rim (5), the tyre valve with its multi-stage valve adjustment assembly is inserted from inside the wheel and through the valve hole in the normal way a standard valve is fitted, and then secured on the wheel rim (5) in the normal way. The base of the multi-stage valve assembly is then connected to the retraction apparatus of the runflat device. Alternatively this may be pre-fitted to the runflat device.

The outer bead is then re-fitted to the wheel rim (5) in the normal way. With the valve core removed from the valve body, a manually operable device such as a screwdriver is used to turn an adjuster within the valve assembly to its required position to allow inflation of the tyre. The valve core is replaced and the tyre (1) is then inflated so that the tyres beads (4) are seated on the wheel rim (5) seats. The tyre (1) is deflated in the normal way, the valve core removed and the valve adjuster turned to the position required for runflat device.

With the valve core in place a standard airline is then attached to the valve and air pressure applied so that the retraction band causes the runflat device to be drawn together inside the wheel and mechanically locked into place. Any remaining air in the assembly system is released by depressing the air valve in the normal way and then the valve core is removed. The valve adjuster is turned to its tyre inflation setting and the valve core replaced.

The tyre (1) is then inflated in the normal way to its required pressure. The runflat device is therefore independent on the presence of any air pressure and the tyre (1) is treated in the normal way.

The preferred embodiment includes a multi-stage adjustable tyre valve assembly. In the present invention a multi-stage valve is used that may be adjusted while it is fitted to the wheel. Therefore, in the invention, a valve already fitted in the valve hole is adjusted without using any tools through a valve hole, as is the case in the prior art. In the invention, tools are not used to adjust, tighten or fit anything inside the wheel. Here, the flow of air is adjusted through a pre-fitted air valve.

The preferred embodiment includes an actuation body with flow-direction valve welded to the base of the metal air valve forming an air valve with adjustable multi-directional flow. By turning the valve using a normal screwdriver the direction of flow can be chosen. In this application air flow can be used to inflate the tyre (1) or to draw together the runflat devices components through a variation of air driven actuation devices.

The preferred embodiment includes a base ring (2) or a number of part-annular sections that form a base ring (2) when connected together, that seats in the wheel's well, which then fits to the main body (6) of the runflat system.

FIG. 1 in the accompanying drawings shows the different components of the invention. The base ring (2) or base ring segments slot on to the bottom of the main body (6) or main body part-annular segments of the runflat device and can be positioned in any suitable position to allow the main body (6) to seat in correct alignment within the beads (4) of the 5 tire (1) while the base ring (2) fits in the wheel's well. The base ring (2) may be of a smaller width that that of the wheel's well and may be movable to fit different widths. This adjustability ensures that the main body (6) is properly supported by the base ring (2) or base ring annular segments sitting within the wheel's well. This adjustability makes the runflat device a universal fit on a wide variety of wheel's with varying well widths and positions relative to the wheel rims centreline. Further, adjustability may be provided by fitting base rings or base ring segments of different depths.

This adjustability for a runflat overcomes the basically hand made/bespoke manufacturing of current runflats where each has to be made individually to fit each different wheel design. There are countless well widths and lateral positions, although maybe three basic depths for wheel wells.

The outer edges of the main body (6) of the runflat device are specially shaped with a beveled edge (3) so that when drawn together during assembly and fitting they centralise within the wheel and tyre assembly specifically within the beads (4) of the tyre.

Figure 2:
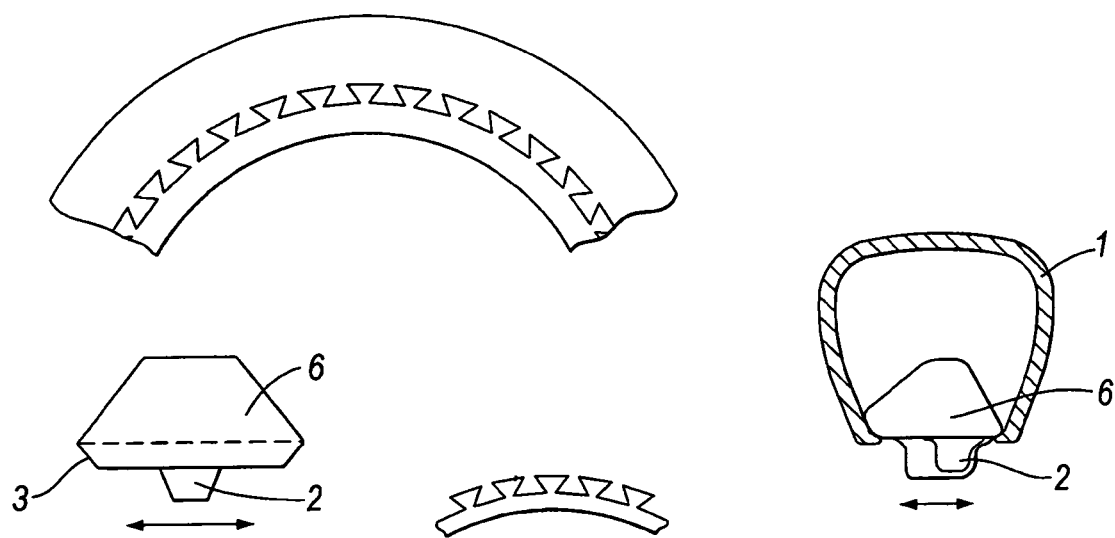
FIG. 2 is a diagram disclosing the bevelled edge of the runflat device.

The beveled edge (3) can be seen in FIG. 2 of the accompanying drawings. The edges will be smooth to allow them to more easily slide into place and locate within the tyres beads (4). Prior to fitting they may be coated with the normal universal tyre fitting lubricant.

The width of the main body (6) may be such that when pulled into place the outer edges push against the inner edges of the beads (4) forming a double bead lock device which acts on both beads (4). Incorporating double bead lock is s significant performance advantage. The multi-stage valve may be provided with means, which allows release of pressure during operation The mechanism for drawing the device together is operated by air pressure and may consist of a steel band fitted through each of the main body segments with a worm-drive to draw the band together, similar to a 'Jubilee Clip'. The worm drive may be air-operated. The worm-drive is connected to the base of the multi-stage valve by a small flexi-tube. The ends of each main body segment incorporate common snap-lock technology to hold them in place once squeezed together with air pressure. The main body segments may be fitted with an outer rotatable ring.

The components of the multi-stage valve of the runflat system can be seen in FIG. 3 and is described below:

The valve assembly comprises a housing (10) which houses a valve member (7), which consists of a revolvable which may be in the form of a cylinder with one end closed, similar to a piston. The valve housing (10) is arranged to be attached to the wheel rim and can be operated manually by using a standard 'Schraeder' valve or a screwdriver, or a similar turning mechanism. It is preferred that the diameter of the valve housing is slightly wider than the diameter of the opening through the centre of the valve. This is so that any air escaping around the valve cylinder and accumulating under the piston does not force the valve cylinder upwards. The retraction band or retraction mechanism is connected base of the valve member (7), which draws the runflat device into wheel, as described in detail above.

Figure 3:
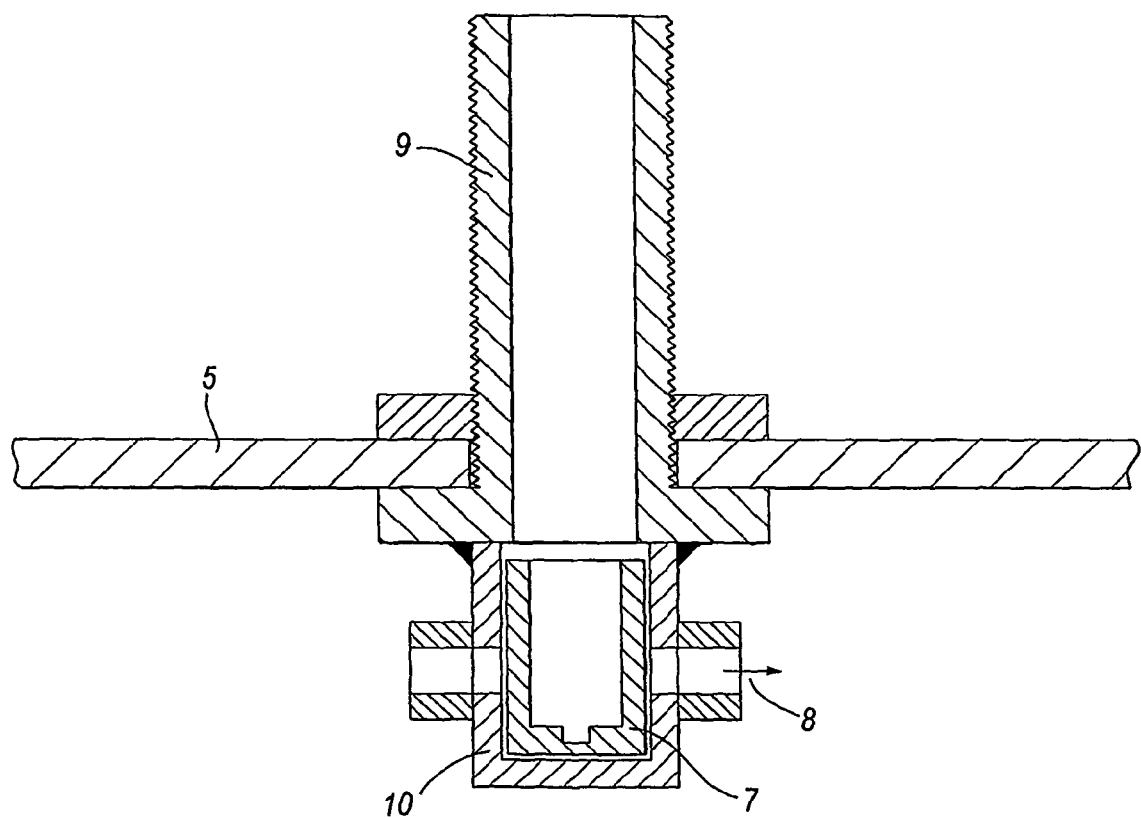
FIG. 3 is a diagram depicting the components of a multi-stage air valve according to the present invention.

FIG. 3 shows that an opening (8) in the side of the valve cylinder. The valve cylinder (7) can be turned through a required position for selection the direction of airflow. FIG. 3 shows that the cylinder can be turned to an opening at 180°, thereby requiring a half turn for closing one exit and allowing air to escape through the horizontally opposed exit. There could also be more openings or air exits, (not shown in figures) spaced closer together requiring quarter turns for operating the valve, for example, three openings at 120° or four at 90° spacing. One of the additional exits may be used to dismount the runflat device by rotating the worm drive in the opposite direction to the direction for tightening. It is preferred that the valve cylinder (7) should be a close sliding fit in its housing to allow turning without excessive air loss.

The bottom portion of the multi-stage valve assembly shown in FIG. 3 may be manufactured separately and welded to a standard steel valve body (9). This standard valve body may be a commercially available steel valve as used on many police or security vehicles. Alternatively it could be manufactured as a single piece. To simplify manufacture in a single piece, the base of the valve assembly could be screwed on. In this way, the assembly would consist of a simple cylindrical housing with a screwed on cap on one end, thereby simplifying mass production.

It will be appreciated that the present invention is not restricted to the arrangement and features as disclosed in the preferred embodiment. A few examples of additional features and functionality, some of which are be already incorporated in the preferred embodiment and which may be used either alone or in combinations with each other are as follows:

The presence of a multi-stage air valve integrated with standard metal tyre valve of the invention may be combined with the use of the multi-stage air valve and standard air pressure line to draw components together from outside the wheel assembly.

It is preferable to include adjustable base rings or support rings for providing adaptability to fit all wheel well types and positions of wells within the wheel design.

It is preferable to include the ability to change support rings for wheels wells with alternate depths to encompass different wheel well depths.

It is preferable to implement functionality such that using pneumatics can be used to fix runflat device in place.

It may be preferable to incorporate snap-lock fixings to secure segments.

It is preferred that the main body (6) of the assembly is self-aligning with beads of the tyre.

The run flat assemble may be arranged to act as a bead lock due to beveled smooth edge, pulled down to wedge against tyres beads.

The present invention may be arranged to be used as an air operated worm-drive.

The invention claimed is:

1. A runflat device arranged to be disposed within a wheel well of a wheel having a rim (5) for securing a tire (1), the device comprising a valve assembly arranged to be secured to the wheel and a plurality of part-annular components, said runflat device arranged to be drawn together and drawn onto the wheel by a retraction mechanism when air pressure is applied to said valve.

2. The runflat device as claimed in claim 1, including a plurality of main body parts (6) for sitting within beads (4) of the tire (1) and a base ring (2) arranged to fit within the wheel well.

3. The runflat device as claimed in claim 2, wherein each of said main body parts (6) is provided with a bevelled outer edge (3).

4. The runflat device as claimed in claim 2, wherein said base ring (2) is movable with respect to the main body thereby allowing said base ring (2) to be capable of fitting a plurality of differing wheel well widths.

5. The runflat device as claimed in claim 1, wherein said valve assembly is an adjustable multi-stage valve capable of multi-directional air flow, said multi-stage valve being attached to the base of the wheel's standard air valve (9), said multi-stage valve being operated by turning the same in the direction of desired air flow.

6. The runflat device as claimed in claim 5, wherein said direction of airflow can be manually selected by a user by turning a screwdriver towards an opening in a desired direction.

7. The runflat device as claimed in claim 5, wherein said multi-stage valve comprises a revolvable valve cylinder (7) along with a plurality of openings (8) for allowing air flow through the valve.

8. A wheel fitted with the runflat device as claimed in claim 1.

9. The runflat device as claimed in claim 1, wherein the part-annular components are drawn together by the retraction mechanism.

10. The runflat device as claimed in claim 1, wherein the retraction mechanism comprises a retraction band.

11. The runflat device as claimed in claim 1, wherein the retraction mechanism comprises a steel band fitted through each of the part annular components with a worm-drive to draw the steel band together.

12. The runflat device as claimed in claim 11, wherein the worm-drive is air-operated.

* * * * *